US012124309B2

(12) United States Patent
Abhishek et al.

(10) Patent No.: US 12,124,309 B2
(45) Date of Patent: Oct. 22, 2024

(54) FAULT DETECTION DURING ENTRY TO OR EXIT FROM LOW POWER MODE

(71) Applicant: NXP USA, Inc., Austin, TX (US)

(72) Inventors: Kumar Abhishek, Bee Cave, TX (US); Subhashrahul Shekhar, Austin, TX (US); Aditya Musunuri, Austin, TX (US); Yi Zheng, Austin, TX (US)

(73) Assignee: NXP USA, Inc., Austin, TX (US)

( * ) Notice: Subject to any disclaimer, the term of this patent is extended or adjusted under 35 U.S.C. 154(b) by 58 days.

(21) Appl. No.: 18/055,915

(22) Filed: Nov. 16, 2022

(65) Prior Publication Data

US 2024/0160265 A1    May 16, 2024

(51) Int. Cl.
| G06F 1/00 | (2006.01) |
| G06F 1/30 | (2006.01) |
| G06F 1/3296 | (2019.01) |
| G06F 11/07 | (2006.01) |
| G06F 11/30 | (2006.01) |

(52) U.S. Cl.
CPC .............. G06F 1/30 (2013.01); G06F 1/3296 (2013.01); G06F 11/0772 (2013.01)

(58) Field of Classification Search
CPC ....... G06F 1/30; G06F 1/3296; G06F 11/0772
See application file for complete search history.

(56) References Cited

U.S. PATENT DOCUMENTS

| 8,896,159 | B2 | 11/2014 | Yeh | |
| 9,190,989 | B1 * | 11/2015 | Sharda | G05F 1/66 |
| 9,407,264 | B1 * | 8/2016 | Ali | H03K 19/0016 |
| 9,411,390 | B2 * | 8/2016 | Smith | G06F 1/3287 |
| 9,627,035 | B2 | 4/2017 | Vyavahare et al. | |
| 9,772,668 | B1 * | 9/2017 | Soebroto | G06F 1/3287 |
| 11,119,153 | B1 | 9/2021 | Srinivasan | |
| 11,442,108 | B1 * | 9/2022 | Srinivasan | G01R 31/31713 |
| 2011/0221483 | A1 * | 9/2011 | Liu | G06F 1/3237 |
| | | | | 327/142 |
| 2012/0068539 | A1 * | 3/2012 | Shiotani | H03K 19/0016 |
| | | | | 307/43 |

(Continued)

FOREIGN PATENT DOCUMENTS

| EP | 3742257 A1 | 11/2020 |
| EP | 3926349 A1 | 12/2021 |

Primary Examiner — Xuxing Chen
(74) Attorney, Agent, or Firm — Joanna G. Geld

(57) ABSTRACT

A system-on-chip (SoC) having a switchable power domain capable of being placed in a standby mode during which a power supply of the switchable power domain is gated and having an always-on power domain. The always-on power domain includes an input sampling circuit, and the switchable power domain includes an input/output (IO) circuit configured to, during normal operation, receive data at a corresponding signal pin when an input buffer of the IO circuit is enabled, in which the corresponding signal pin is coupled to the input sampling circuit. The input sampling circuit is configured to, while the switchable power domain is entering the standby mode but before the power supply is gated, provide an override input enable signal to enable the input buffer of the IO circuit, sample an input bit value on the corresponding signal pin, and store the sampled bit value to provide an injection current fault indicator.

19 Claims, 4 Drawing Sheets

(56) References Cited

U.S. PATENT DOCUMENTS

| | | | |
|---|---|---|---|
| 2015/0039916 A1* | 2/2015 | Case | G06F 1/263 |
| | | | 713/310 |
| 2021/0357015 A1* | 11/2021 | Mangano | G06F 1/3243 |
| 2022/0308610 A1* | 9/2022 | Srinivasan | G05F 1/562 |
| 2023/0102099 A1* | 3/2023 | Raju | G06F 11/0793 |
| | | | 714/15 |
| 2023/0168699 A1* | 6/2023 | Srinivasan | H03K 19/0016 |
| | | | 327/544 |

* cited by examiner

FAULT DETECTION DURING ENTRY TO OR EXIT FROM LOW POWER MODE

BACKGROUND

Field

This disclosure relates generally to integrated circuits, and more specifically, to fault detection during entry to or exit from low power mode.

Related Art

Many chip architectures need to detect critical safety violations. Such hardware checks are typically part of the chip design. For example, at the system-on-chip (SoC) level, safety mechanisms are present in the form of a fault collection and control unit (FCCU) which triggers a response in the case of a detected safety violation. Watchdog timers are also used to determine safety defects. However, entering and exiting low power modes creates unique issues, making it difficult to observe or detect potential faults or potential hardware problems (since the FCCU is not running). Therefore, a need exists for improved fault detection, especially during entry to or exit from low power mode.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

As described above, entry into and exit from low power modes, such as a standby mode, present unique issues which make it difficult to observe or detect potential faults or hardware problems within a data processing system. These undetected faults or problems can prevent safe operation of the data processing system, or result in damage to the data processing system. For example, a data processing system may include a processor as well as a power management integrated circuit (PMIC) coupled to the processor. One possible problem in such a system occurs when a pin of the processor is driven high by mistake due to connections to the pin within the system, from sources external the processor itself. This can result in undesired power consumption which eats into the overall system power budget specification, or can result in damage to the part. Other issues may result when a reset event is received during uncertainty windows during the entry into or exit from standby mode. Resets during such a window may result in the data processing system being stuck in reset indefinitely. In other examples, resets during such a window may result in failing to reset one or more power domains of the processor.

As will be described in more detail below, in one aspect, pin injection current detector logic within the processor detects if any pin experiences possible injection currents upon entering standby. In one embodiment, when this condition is detected, diagnostic information is captured and a wakeup event is generated. In an alternate embodiment, the information is logged but no wakeup event is generated. In another aspect, an uncertainty window in the procedure for entering standby mode is defined during which a reset event (such as a destructive reset event) can lead to an indefinite deadlock with no recovery. In one embodiment, when this condition is detected, a wakeup event is generated and diagnostic information is captured. In another aspect, an uncertainty window in the procedure for exiting standby (i.e. in the procedure for wakeup) is defined during which a reset event (e.g. a pin reset event) can lead to incorrect propagation of the reset inside the processor. In one embodiment, when this condition is detected, diagnostic information is captured. In alternate embodiments, for any of these conditions, different or additional responses may be taken by the SoC.

Figure 1:
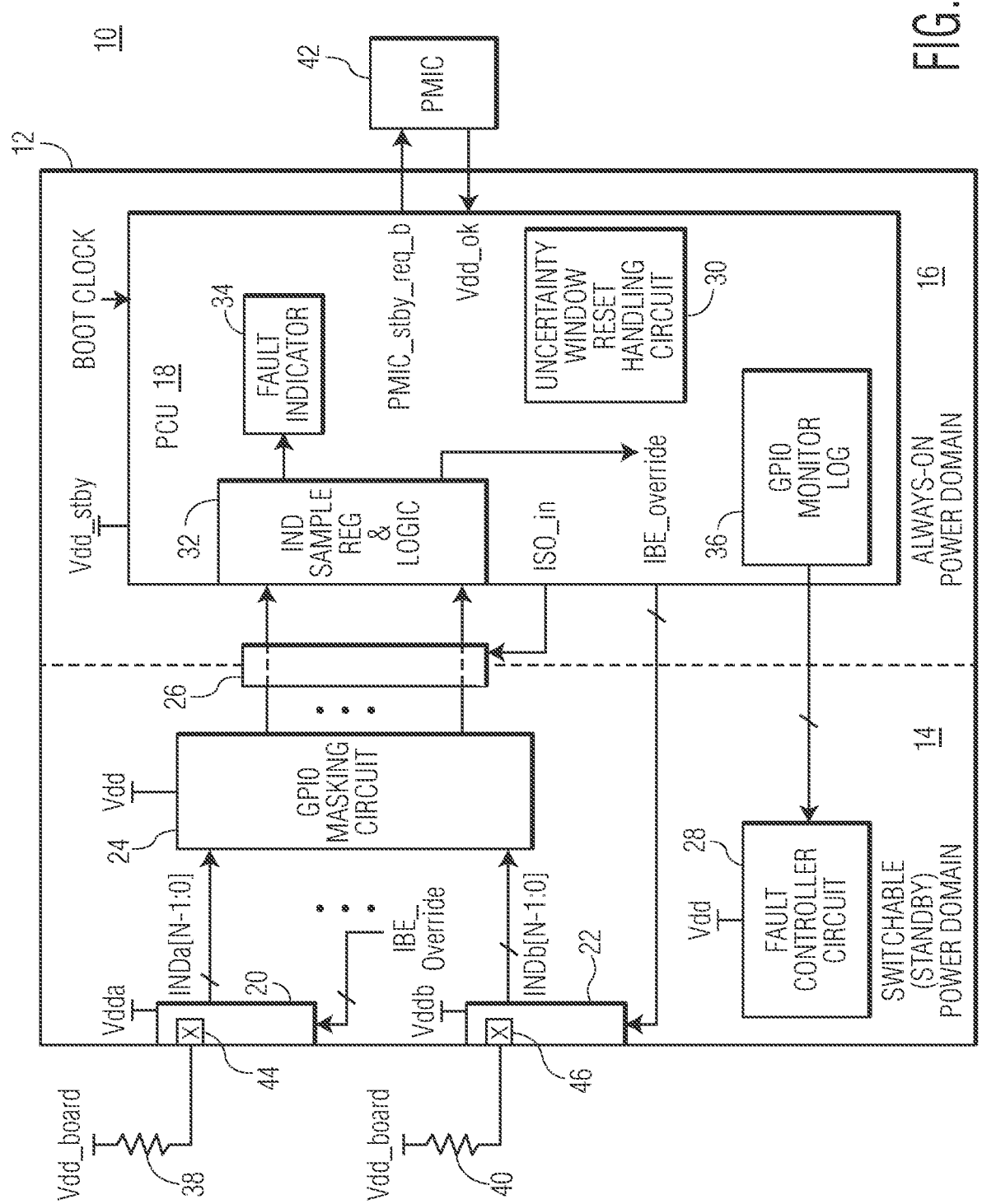
FIG. 1 illustrates, in block diagram form, a data processing system, in accordance with one embodiment of the present invention.

FIG. 1 illustrates, in block diagram form, a data processing system 10 which includes a processor 12 and a power management integrated circuit (PMIC) 42. Note that processor 12 may be referred to as an SoC and be divided into any number of power domains, including an always-ON power domain 16, and any number of switchable power domains such as switchable power domain 14. A switchable power domain is one whose power is removed or turned off during standby mode, and therefore, may be referred to as a switchable standby power domain. A switchable power domain is therefore powered by a power supply voltage, Vdd, which is capable of being gated (which may be done by gating the power supply from the circuitry of the power domain or turning off the power supply to the power domain). Therefore, the voltage supply of the switchable power domain may be referred to as a switchable power supply. An always-ON power domain is always powered, and does not enter a low power mode or standby mode, and is therefore powered by an always-on power supply voltage, Vdd_stby, which remains on during low power or standby mode (and may therefore also be referred to as a continuous power supply voltage). Also, as used herein, standby mode is considered a low power mode in which power is decreased or turned off.

Switchable power domain 14 includes a set of IO circuits 20 and a set of IO circuits 22. Each set of IO circuits includes any number of IOs circuits, such as general purpose IOs (GPIOs). For example, set 20 includes a GPIO with an IO signal pad 44, and set 22 includes a GPIO with an IO signal pad 46. Each IO pad may also be referred to as a signal pin or external pin of SoC 12. Each of sets 20 and 22 may form a pad ring section of a pad ring of SoC 12, and SoC may include any number of pad ring sections. Each GPIO includes a first voltage supply terminal configured to provide a first supply voltage, such as Vdda, for those GPIOs of set 20 or Vddb for those GP IOs of set 22 and a second voltage supply terminal configured to provide a second supply voltage less than the first supply voltage, such as Vss or ground. (As used herein, note that each of the first and second power supply terminals can be referred to by the corresponding supply voltage, e.g. Vdda, Vddb, or Vss.) The corresponding signal pin of a GPIO can therefore be coupled to either voltage supply terminal, as needed, to provide an output data signal (OutD) when an output buffer enable (OBE) signal is asserted for the GPIO. The corresponding signal pin of a GPIO can receive an input data signal (IND) when an input buffer enable (IBE) signal is asserted for the GPIO. Therefore, each IO circuit in set 20 or set 22 includes an input buffer and an output buffer coupled to each signal pad (note that, if the signal pad is an IO pad, the IO circuit includes both an input and output buffer, but if the signal pad is just an input signal pad, then the IO circuit may only include an input buffer and not an output buffer.) Each GPIO also includes electro-static discharge (ESD) circuitry coupled between the signal pin and each of the first and the second supply voltage terminals to protect against damage from ESD events, as known in the art.

In the illustrated embodiment, each of Vdda and Vddb are considered switchable power supply voltages, which can be gated from the GPIOs or powered down during standby so as to reduce leakage power in the pad ring. IO pad 44 is coupled via a pull-up resistor 38 to a system power supply voltage terminal which is configured to supply a system-level (e.g. board-level) supply voltage Vdd_board. IO pad 46 is coupled via a pull-up resistor 40 to Vdd_board. (As used herein, the board-level power supply terminal can simply be referred to as Vdd_board). Note that pull-up resistors 38 and 40 are located within system 10 but are external to SoC 12. Each GPIO is capable of receiving input data bits (when its corresponding IBE signal is asserted) which are then provided to GPIO masking circuit 24. For example, each GPIO of set 20 receives an input from the pad connection and outputs a corresponding input bit, INDa, of a total of N input data bits INDa[N−1:0], and each GPIO of set 22 receives a corresponding input bit, INDb, of a total of N input bits INDb[N−1:0]. INDa[N−1:0] and INDb[N−1:0] are provided to GPIO masking circuit 24. Note that in the illustrated embodiment each of sets 20 and 22 include a same number of GPIOs, but in alternate embodiment, can include a different number of GPIOs. Switchable power domain 14 also includes a fault controller circuit 28.

GPIO masking circuit 24 provides the input data from those selected GPIOs of sets 20 and 22 that are not masked (and thus need to be monitored during entry into standby mode) to power controller unit (PCU) 18 via isolation circuit 26. The received input bits at PCU 18 are stored in IND sample registers and logic 32 which tests for possible injection current conditions. PCU 18 receives a boot clock and also includes a fault indicator storage circuit 34 coupled to IND sample register and logic 32, an uncertainty window reset handling circuit 30, and a GPIO monitor and log circuit 36 (which is configured to provide information to fault controller circuit 28). PCU 18 also provides an output isolation enable signal, ISO out, to isolation circuit 26, and provides input buffer enable (IBE) override signals (IBE_override) to sets 20 and 22 of GPIOs. In one embodiment, each GPIO receives a separate corresponding IBE override signal, or alternatively, multiple GPIOs may receive a corresponding shared IBE override signal. Isolation circuit 26 is configured to isolate input and output signals of circuitry in switchable power domain 14 from always-ON power domain 16, as needed, during standby mode. PCU also provides a standby entry request, PMIC_stby_req_b, to PMIC 42 and receives a Vdd_ok signal from PMIC 42. Any signal name followed by a "_b" indicates that the signal is an active low signal which, when asserted, is a logic level low (i.e. logic level zero) and when negated, is a logic level high (i.e. logic level one). Note that SoC 12 may include more elements and power domains than those illustrated in FIG. 1. For example, SoC 12 may include one or more cores, one or more memories, one or more peripherals, etc.

During normal operation (e.g. when switchable power domain 14 is on or fully powered), each GPIO of sets 20 and 22 operate as known in the art. Upon entering standby mode, though, the switchable power supplies of switchable power domain 14 are typically turned off or gated from the GPIOs so as to reduce leakage current. However, in doing so, during the standby mode, the signal pins may be susceptible to DC injection currents received via its pull-up resistors, such as pull-up resistors 38 and 40, depending on the board-level supply voltage Vdd_board. For example, signal pin 44 is coupled via pull-up resistor 38 to Vdd_board, in which Vdd_board may remain powered up, even when SoC 12 or portions of SoC 12 are in standby mode. In this situation, with Vdd_board powered up (e.g. at 3.3V) and Vdda off (e.g. at 0V) during standby mode, an injection current can be injected through pull resistor 38 to signal pin 44, and through ESD diodes of the GPIO from signal pin 44 to Vdda. If the external resistor pulls a strong current (e.g. if resistor 38 is less than 1K Ohms), the injection current to signal pin 44 can cause damage to the GPIO and other circuits of SoC 12. If the external resistor pulls a weak current (e.g. if resistor 38 is greater than 10K Ohms), the injection current may not cause damage but will still eat into the overall system power budget specification, which is also undesirable.

Figure 2:
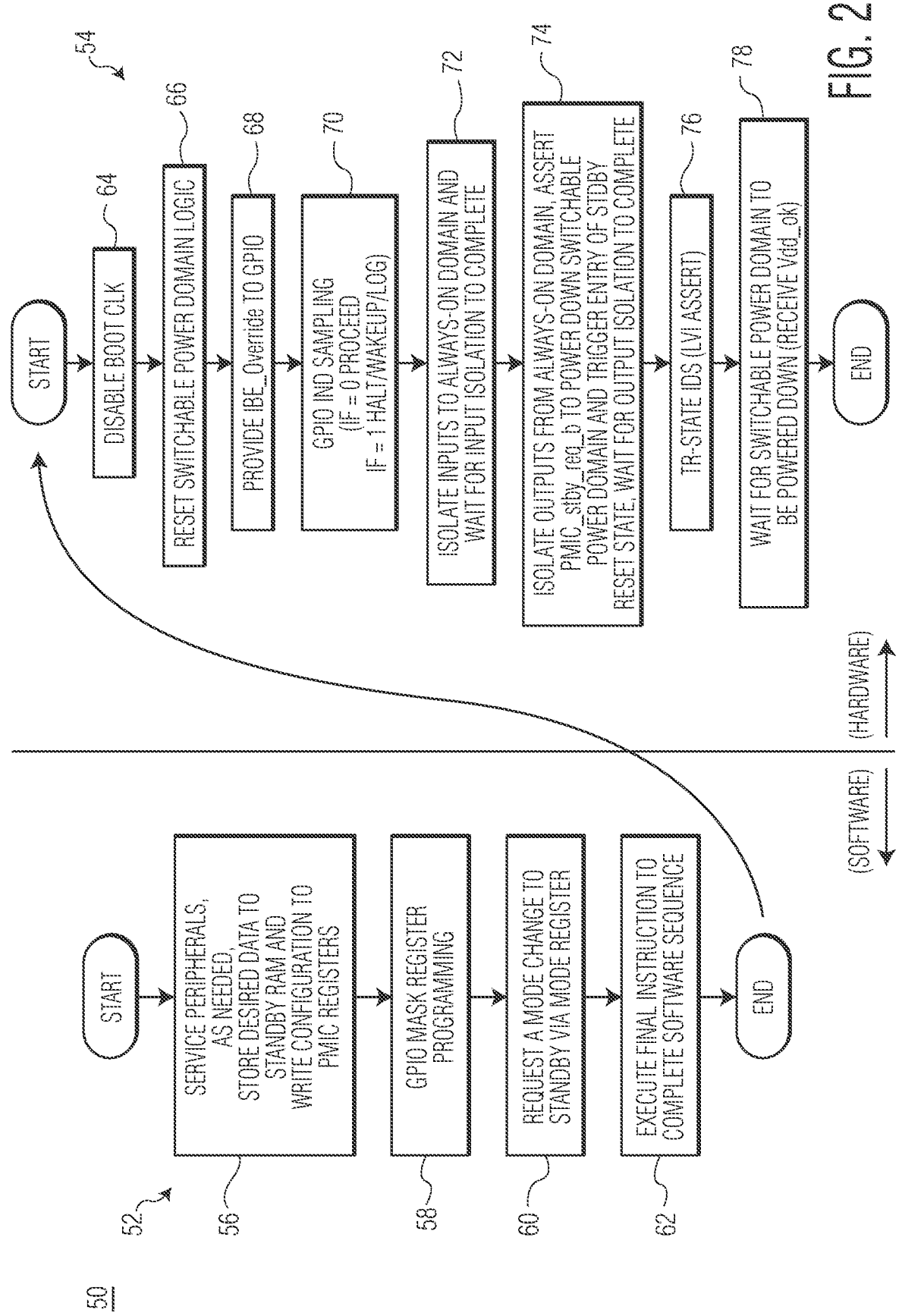
FIG. 2 illustrates, in flow diagram form, a method for entering standby mode in the data processing system of FIG. 1, in accordance with one embodiment of the present invention.

Therefore, in one embodiment, IND sample registers and logic 32 can identify the conditions in which injection currents may be a problem, in which, in response to identifying such conditions, can provide diagnostic information to GPIO monitor log 36. In one embodiment, the IND sample registers and logic 32, in combination with GPIO masking circuit 24 and the IBE_override signal can be collectively referred to as pin injection current detector logic or circuitry. FIG. 2 illustrates a method 50 which is performed to place SoC 12 into standby mode, in accordance with one embodiment of the present invention. Method 50 includes a portion 52 performed by software followed by a portion 54 performed by hardware. In one embodiment, PCU 18 implements a state machine which controls entry into and exit from standby mode. Alternatively, PCU 18 (or other core or circuitry within processor 12) may execute instructions to control the entry into and exit from standby.

Referring first to portion 52 of method 50, upon deciding to enter standby mode, PCU 18 can perform tasks (at block 56) to prepare SoC 12 for entering standby mode. For example, any peripheral may be serviced, as needed, any data (such as data which saves the current state of any portion of SoC 12) can be stored into a standby memory (e.g. a standby read only memory (RAM)), and configuration information can be provided for storage into registers of PMIC 42. Fewer or more actions can be taken, as needed.

At block 58, the GPIO mask register in GPIO masking circuit 24 is programmed to indicate which GPIOs should be tested for the being susceptible to injection currents. For example, if a GPIO is powered by the same voltage supply as the board-level supply, no injection current is possible since both the board-level supply and the switchable supply of the GPIO are at the same voltage. Similarly, if a GPIO is powered by an always-on voltage supply, then it may also not be susceptible to injection currents. Any of these GPIOs which are not susceptible to injection currents can be excluded from testing, and therefore masked by GPIO masking circuit 24. At block 60, a request for a mode change to standby mode is made by writing into a mode register of PCU 18. The mode change to standby mode can be made for all of SoC 12 or for one or more switchable domains of SoC 12. At block 62, a final instruction is executed to complete software portion 52 of method 50. This final instruction depends on the implementation of the entry into standby mode sequence, and can be any instruction which indicates completion of the software sequence, at which point, hardware portion 54 of method 50 begins, which will be described in combination with the waveforms of FIG. 3.

Figure 3:
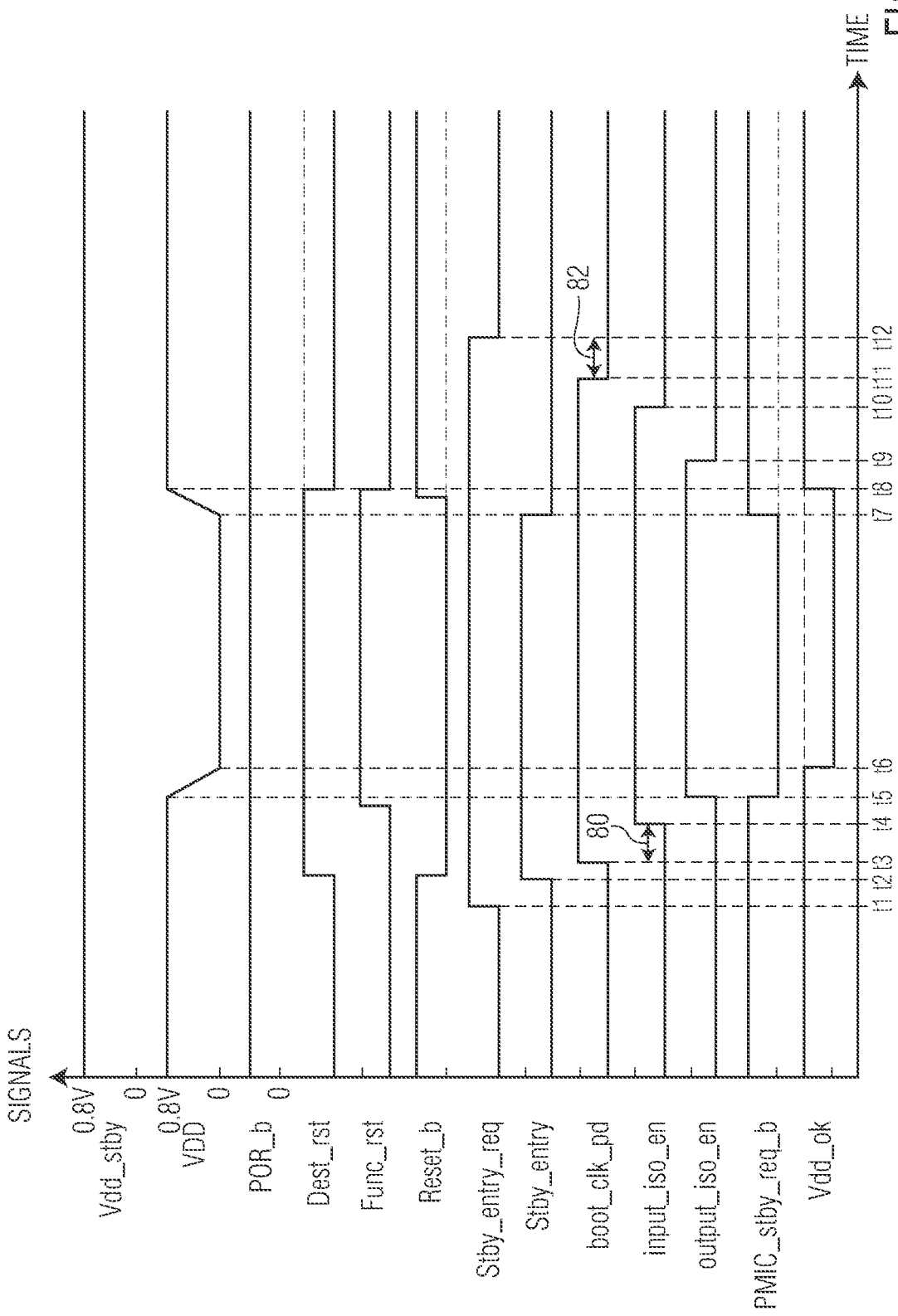
FIG. 3 illustrates waveforms of various signal within the data processing system of FIG. 1, in accordance with one embodiment of the present invention.

FIG. 3 illustrates various waveforms of signals within SoC 12, in accordance with one embodiment of the present invention. The signals include Vdd_stby (the always-on supply voltage) and Vdd (a switchable supply voltage of switchable power domain 14). FIG. 3 illustrates different types of reset signals (POR_b, dest_rst, func_rst, and reset_b) which can be received by SoC 12. These signals will be described in reference to FIGS. 4 and 5 below and are not specifically relevant to the discussion of FIG. 2. FIG. 3 also illustrates a one-bit standby entry request (stby_entry_req), a one bit standby entry acknowledgement (stby_entry), a one-bit boot clock power down signal (boot_clk_pd), a one-bit input isolation enable signal (input_iso_en), and a one-bit output isolation enable signal (output_iso_en). A one-bit PMIC standby request signal (PMIC_stby_req_b) is provided by SoC 12 (e.g. by PCU 18) to the PMIC (e.g. PMIC 42), and a one-bit voltage acknowledge signal (Vdd_ok) is received by SoC 12 (e.g. by PCU 18) from the PMIC. PMIC_stby_req_b is an active low signal, but may be active high in an alternate embodiment. While each signal is illustrated as a one-bit signal, alternate embodiment may communicate similar information, as needed, using multi-bit signals.

Referring back to portion 54 of FIG. 2, upon starting hardware portion 54, the boot clock is disabled at block 64. Therefore, referring to FIG. 3, initially (prior to time t1), SoC 12 is in normal operation in which VDD is on (i.e. fully powered) at 0.8V, the same as Vdd_stby. At time t1, stby_entry_req is asserted (which may correspond to block 60 of portion 52) and at time t2, stby_entry is asserted to acknowledge the request. Then, at time t3, boot_clk_pd is asserted which disables the boot clock. Once the boot clock is disabled, method 50 proceeds to block 66 in which the logic in the corresponding switchable power domain which is being placed in standby mode (i.e. which is to be power gated) is reset. For example, with respect to FIG. 1, switchable power domain 14 will be gated for standby mode and therefore any logic within power domain 14 is reset. In resetting the logic, though, the GPIOs of domain 14 (e.g. the GPIOs of sets 20 and 22) are not reset. Note that with the logic of domain 14 being reset, it is known that no circuitry in domain 14 can drive any of the signal pins within power domain 14. Next, at block 68, the IBE signals of the selected (i.e. non-masked) GPIOs are overridden such that they enable data inputs to be received at the corresponding signal pin of power domain 14.

With IBE asserted for all the selected GPIOs of domain 14, the input values from these GPIOs (the selected inputs of INDa[N−1:0] and INDb[N−1:0]) are sampled (at block 70). For example, in the illustrated embodiment, these values are sampled and captured into storage circuitry (e.g. registers) of IND sample registers and logic 32 of PCU 18. In one embodiment, an input bit for each of the selected GPIOs is sampled and stored by PCU 18. If the corresponding input bit, IND, of any unmasked GPIO is high (e.g. a logic level one), it is known that something external to SoC 12 (e.g. in system 10, such as on the circuit board to which SoC 12 is attached) is driving the signal pin of the GPIO, since it is not possible for anything in domain 14 to do so.

In this case, an injection current fault is indicated since the corresponding signal pin is susceptible to injection current because something is driving the signal pin high when nothing should be doing so.

Therefore, if the sampled bit value of an unmasked GPIO is low (a logic level zero), there is no problem indicated and method 50 proceeds. However, if the sampled bit value is high, then in one embodiment, it can simply be logged into GPIO monitor log 36. For example, if this testing is done during development, the problematic GPIOs can be identified with this process, and, by using the logged information, changes can be made such that these problematic GPIOs are not power gated so as not to risk injection currents. For example, if the design of SoC 12 is modified such that the GPIOs which were identified as problematic instead remain powered even when the corresponding power domain is placed into standby mode, they are far less likely to be susceptible to injection currents.

In the case that this condition is detected in the field, after development, any of the sampled bits being high can result instead in halting or aborting entrance into standby mode. In one embodiment, a wakeup is initiated such that the entrance into standby mode is not only halted or aborted, but SoC 12 is returned to normal mode. In these cases, note that the condition can still be logged by GPIO monitor log 36. This logged information can then be used, for example, by fault controller circuit 28 once out of standby mode.

In one embodiment, each of the sampled bits of the unmasked GPIOs stored in IND sample registers and logic circuit 32 provides a corresponding injection current fault indicator for the corresponding signal pin of the corresponding GPIO. In the illustrated embodiment, an OR of all the sampled bits of the unmasked GPIOs can be performed by the logic in IND sample reg and logic 32 and the result stored in storage circuitry 34 as an injection fault indicator corresponding to all the sampled GPIOs. When asserted, this fault indicator simply indicates that one of the unmasked GPIOs is susceptible to injection currents. In alternate embodiments, the logic in IND sample registers and logic 32 can perform any combination of the sampled bits or of subsets of the sampled bits, as desired, which can also be logged in GPIO monitor log 36. In addition, actions such as generating a wakeup can be done based on the result of any of these combinations.

Referring back to FIG. 2, after block 70, method 50 proceeds to block 72 in which the inputs to the always ON domain (e.g. always ON domain 16) are isolated. For example, at time t4 of FIG. 3, input_iso_en is asserted to initiate isolation of the inputs, and upon completion of the input isolation process, method 50 proceeds to block 74 in which the outputs from the always ON domain (e.g. domain 16) to the switchable power domain (e.g. switchable power domain 14) are isolated. For example, this may correspond to time t5 in FIG. 3 at which output_iso_en is asserted. With the output isolation, the outputs of always-on domain 16 are isolated from switchable power domain 14, and the sampled GPIO IND signals from domain 14 are isolated from domain 16 by isolation circuit 26 (enabled by ISO in provided by PCU 18 to isolation circuit 26). At block 74, PCU 18 also asserts PMIC_stby_req_b (also at time t5 in FIG. 3) to trigger entry into the standby reset state by PMIC 42. Upon completion of the output isolation to power domain 14, at block 76, the GPIOs can be tri-stated since the INDa/INDb signals have already been sampled, and a low voltage inhibit (LVI) indicator can be asserted to prevent the GPIO from being power gated.

Next, at block 78, PCU 18 awaits for the switchable power domain to be powered down. For example, in response to PMIC_stby_req_b, PMIC 42 turns off Vdd, and once Vdd is off (at 0V), corresponding to time t6 of FIG. 3, Vdd_ok is asserted by PMIC 42, indicating to PCU 18 that power domain 14 (powered by Vdd) has been powered down. However, with the testing of the GPIOs described above, the problematic GPIOs in the switchable domain can be protected from the adverse effects of any injection current via the corresponding pull-up resistors.

As will be discussed below in reference to FIGS. 4 and 5, there are certain windows of time during entry into or exit from standby mode which are referred to as uncertainty windows, during which received resets may result in problems or undetectable faults. For example, if particular resets are received during these uncertainty windows, SoC 12 may get stuck in an unknown state or resets may fail to propagate as needed through SoC 12. As mentioned above, FIG. 3 illustrates different reset signals for different types of resets which may be received by SoC 12. The first one (illustrated immediately below the VDD waveform) is a power on reset signal (POR_b), which is an active low signal. The second one is a destructive reset (dest_rst), the third is a functional reset (func_rst), and the fourth is a pin reset signal (reset_b), which is also active low. Each of dest_rst and func_rst are active high, but in alternate embodiments, could be active low instead. Similarly, POR_b and reset_b could instead be active high. In one embodiment, a destructive reset is a reset in which a complete reset of SoC 12 is performed, while a functional reset is a reset which may reset only one or more portions (e.g. switchable power domains) of SoC 12. Reset_b may be referred to as a pin reset which is received on a pin of SoC 12 and can represent any type of reset.

A first window of uncertainty is represented by window 80 which spans from time t3 (the time when the boot clocks are disabled or powered down) to time t4 (the time when the inputs from the switchable power domain to the always ON power domain are isolated). A problem occurs when a destructive reset (dest_rst) is received during this window (receipt of a destructive reset corresponds to the assertion of dest_rst to a logic level one). In FIG. 3, the solid lines for the waveforms for dest_rst and PMIC_stby_req_b represent the signals during correct operation when entering standby mode. The horizontal dashed lines for these waveforms, though, illustrate problems which occur when a destructive reset is received during window 80. If a destructive reset is received (corresponding to assertion of dest_rst) during the standby entry during window 80, there is no boot clock to control the reset sequence to bring SoC 12 out of reset. Therefore, while PMIC_stby_req_b is asserted (to a logic level zero) to the PMIC, which causes the PMIC to start shutting off the voltage supplies (e.g. VDD), the PMIC does not know that instead SoC 12 is going into reset. Without a boot clock, the destructive reset causes SoC 12 to remain stuck, in which, for example, PMIC_stby_req_b is not recovered after reset as should happen (in which the correct operation is illustrated with the solid line waveform of FIG. 3), but instead stays asserted (in which this incorrect operation is illustrated by the dashed horizontal line after time t7). Also in this case, without the boot clock, the dest_rst may not be released (as indicated by the dashed horizontal line after time t8), and the voltage supplies may not be recovered (back to 0.8V) as they need to be.

In some embodiments, PMIC 42 may include a watchdog timer which, after a certain amount of time of PMIC_stby_req_b being asserted low, the PMIC generates a power on reset to get SoC 12 out of the stuck state. However, not all PMICs include such watchdog timers. Therefore, in one embodiment, circuitry 84 of FIG. 4 is included as part of PCU 18 (within uncertainty window reset handling circuit 30) to detect this problematic condition.

Figure 4:
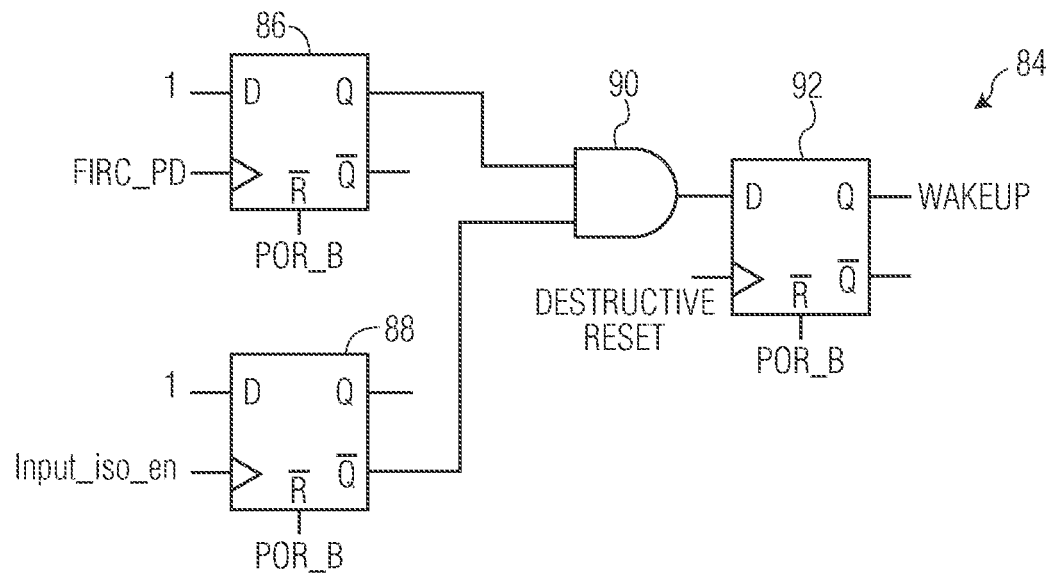
FIGS. 4 and 5 illustrate, in block diagram form, examples of uncertainty window reset handling circuits within the data processing system of FIG. 1, in accordance with embodiments of the present invention.

FIG. 4 illustrates, in block diagram form, a circuit 84 for detecting occurrence of a destructive reset during an uncertainty window defined as being between the time the boot clocks are disabled (i.e. powered down) and the inputs are isolated. Circuit 84 includes D flip flops 86, 88, and 92, and an AND gate 90. A D input of each of flip flops 86 and 88 receive a single bit having a value of one. Flip flops 86, 88, and 82 operate in accordance with a rising edge as the active edge at the clock input. Therefore, for each of these flip flops, upon a rising edge received at a clock input, the value at its D input is provided as its Q output (or as the inverse of Q, illustrated with a bar over the Q or can be referred to as Qb). A clock input of flip flop 86 receives boot_clk_pd, such that, upon assertion of boot_clk_pd to a logic level one, the Q output of flip flop 86 becomes a one as well. A clock input of flip flop 88 receives input_iso_en, such that, upon assertion of input_iso_en to a logic level one, the Qb output of flip flop 88 becomes a zero. The Q output of flip flop 86 and the Qb output of flip flop 88 are provided as inputs to AND gate 90. An output of AND gate 90 is provided to a D input of flip flop 92. A clock input of flip flop 92 receives dest_rst, and a Q output of flip flop 92 provides a wakeup indicator (which, when asserted to a logic level one, initiates a wakeup from standby mode). Also, the inverse reset input of each of flip flops 86, 88, and 92 receives POR_B, such that, when POR_B is asserted low (which indicates a power on reset has occurred), the Q outputs of the flip flops are all reset to zero.

In operation, when the boot clock is powered down (upon assertion of boot_clk_pd to a one), a one is provided by the Q output of flip flop 86 to the first input of AND gate 90. While input_iso_en has not yet been asserted, the Q output of flip flop 88 remains at zero and thus Qb at one. Therefore, the second input of AND gate 90 remains a one as well such that the output of AND gate 90 also remains a one. Once input_iso_en is asserted to a one, though, the second input of AND gate 90 is negated to a zero, causing the output of AND gate 90 to return to zero. If a destructive reset is received after boot_clk_pd has been asserted, but before assertion of input_iso_en, the output of AND gate 90 (a logic level one) will be provided as the wakeup indicator, resulting in a wakeup of SoC 12. However, if a destructive reset is received either prior to assertion of boot_clk_pd or after assertion of input_iso_en, any received destructive reset will simply result in a zero (at the output of AND gate 90) to propagate to the wakeup indicator, thus not causing a wakeup of SoC 12. Therefore, circuit 84 ensures that if a destructive reset is received during window 80 of FIG. 3, the wakeup indicator is asserted. In one embodiment, assertion of the wakeup indicator does not actually result in a wakeup of SoC 12 but is simply logged and read later to determine that a problematic destructive reset occurred.

Referring back to FIG. 3, a second window of uncertainty is represented by window 82 which spans from time t11 (the time when the boot clocks are enabled or powered up) to time t12 (the time when stby_entry_req is released, i.e. negated, by PCU 18). A problem occurs when a pin reset (e.g. reset_b) is received during this window. For example, in one embodiment, receiving a pin reset during this window should result in a reset of both domains 16 and 14. However, in some cases, the resets may not propagate properly within window 82, resulting in only one of the domains (e.g. domain 14) being reset but not domain 16.

Figure 5:
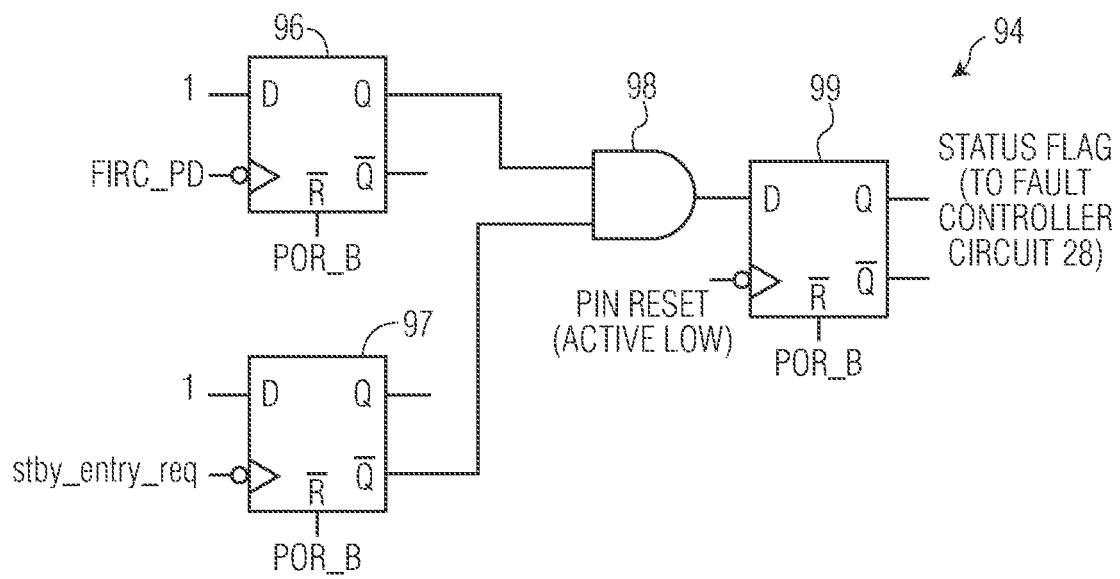

FIG. 5 illustrates, in block diagram form, a circuit 94 for detecting occurrence of a pin reset during an uncertainty window defined as being between the time the boot clocks are enabled (i.e. powered up), and the stby_entry_req negated (i.e. cleared to zero). Circuit 94 includes D flip flops 96, 97, and 99, and an AND gate 98. A D input of each of flip flops 96 and 97 receive a single bit having a value of one. Flip flops 96, 97, and 99 operate in accordance with a falling edge as the active edge at the clock input (indicated by a circle at the clock inputs). Therefore, for these flip flops, upon a falling edge received at a clock input, the value at its D input is provided as its Q output (and its inverse as its Qb output). An inverse clock input of flip flop 96 (indicated by the circle) receives boot_clk_pd, such that, upon negation of boot_clk_pd to a logic level zero, the Q output of flip flop 96 becomes a one as well. An inverse clock input of flip flop 97 receives stby_entry_req, such that, upon negation of stby_entry_req to a logic level zero, the Q output of flip flop 97 becomes a one. The Q output of flip flops 96 and the Qb output of flip flop 97 are provided as inputs to AND gate 98. An output of AND gate 98 is provided to a D input of flip flop 99. An inverse clock input of flip flop 99 receives a pin reset (which may be, for example, an active low signal such as reset_b of FIG. 3), and a Q output of flip flop 99 provides a status flag corresponding to the detected pin reset (which, when asserted to a logic level one, indicates occurrence of the detected pin reset during the defined uncertainty window). Also, the inverse reset input of each of flip flops 96, 97, and 99 receives POR_B, such that, when POR_B is asserted low (which indicates a power on reset has occurred), the Q outputs of the flip flops are all reset to zero.

In operation, while the boot clock is powered down (while boot_clk_pd is at a logic level one, prior to negation of boot_clk_pd), a zero is provided as the Q output of flip flop 96 to the first input of AND gate 90, causing the output of AND gate 98 to also be at zero. While stby_entry_req remains high, the Q output of flip flop 97 remains at zero and thus Qb at one. Therefore, the second input of AND gate 98 remains a one. However, while the Q output of flip flop 96 remains at zero, the output of AND gate 98 also remains at zero. Once boot_clk_pd is negated to a zero, though, a one is provided as the Q output of flip flop 96 to the first input of AND gate 98, causing the output of AND gate 98 to also transition to one. If an active low pin reset is received at this time, the value of one at the output of AND gate 98 will be provided as the status flag. Therefore, if the active low pin reset is received any time after boot_clk_pd has been negated, but before negation of stby_entry_req, a value of one will be provided as the status flag. However, if an active low pin reset is received either prior to negation of boot_clk_pd or after negation of stby_entry_req, any received active low pin reset will simply result in a zero (at the output of AND gate 98) to propagate through flip flop 99 as the status flag. Therefore, circuit 94 ensures that if an active low pin reset is received during window 82 of FIG. 3, the status flag is asserted (and can therefore be logged and provided, for example, to fault controller circuit 28 upon wakeup).

In this manner, flip flops, such as flips 86 and 88 of FIG. 4 or flip flops 96 and 97 of FIG. 5 can be used to define an uncertainty window, during which occurrence of a selected reset can be detected (using a flip flop such as flip flop 92 or 99) to provide an indication of that occurrence. The indication can cause an event to occur in SoC 12 (such as a wakeup or interrupt), or can simply provide a corresponding status flag which can be logged and evaluated at a later time. In alternate embodiments, different circuits may be used to define uncertainty windows and detect occurrences of selected resets, such as by using different types of flip flops or logic gates.

Therefore, by now it can be appreciated how circuitry with an SoC can be used to detect various fault conditions which may be overlooked by current fault detection circuits. For example, in one aspect, possible injection current conditions for the GPIOs of the SoC can be detected in which such conditions can be logged or result in a wakeup event. Furthermore, by logging such conditions during development of the SoC, the design of the SoC can be updated in order to ensure that the GPIOs identified as problematic are no longer susceptible to injection currents. In another aspect, uncertainty windows can be defined in which occurrence of selected reset events during the uncertainty windows can be detected. For example, the uncertainty windows and the selected reset events can be those which would result in problems such as causing the SoC to enter an indefinite deadlock or prevent the proper propagation of resets to one or more power domains. The detection of the occurrence of these selected reset events can be logged or can be used to generate different responses, such as, for example, wakeup events or interrupts. In this manner, improved fault detection can be achieved.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or a b following the name ("b" or "_b"). In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate multiple signals or conductors (e.g. the conductors of a bus) or the bit locations of a value. For example, "conductors [7:0]" indicates 8 conductors or 8 signals, and "bus 60 [7:0]" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" preceding a number indicates that the number is represented in its binary or base two form.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also for example, in one embodiment, the illustrated elements of processor 12 are circuitry located on a single integrated circuit or within a same device. Alternatively, processor 12, as well as system 10, may include any number of separate integrated circuits or separate devices interconnected with each other. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as memory 35 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Although the invention is described herein with reference to specific embodiments, various modifications and changes can be made without departing from the scope of the present invention as set forth in the claims below. For example, processor 12 may include any number and combination of switchable power domains and always-ON domains. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a system-on-chip (SoC) has a switchable power domain capable of being placed in a standby mode during which a power supply of the switchable power domain is gated from the switchable power domain and has an always-on power domain. The SoC includes an input sampling circuit in the always-on power domain; and an input/output (IO) circuit in the switchable power domain configured to, during normal operation, receive data at a corresponding signal pin when an input buffer of the IO circuit is enabled, wherein the corresponding signal pin is coupled to the input sampling circuit. The input sampling circuit is configured to, while the switchable power domain is entering the standby mode but before the power supply is gated, provide an override input enable signal to enable the input buffer of the IO circuit, sample an input bit value on the corresponding signal pin, and store the sampled bit value to provide an injection current fault indicator. In one aspect, the SoC includes a plurality of IO circuits in the switchable power domain, including the IO circuit, wherein the input sampling circuit is configured to, while the switchable power domain is entering the standby mode but before the power supply is gated, provide the override enable signal to enable input buffers of each of the plurality of IO circuits, and sample a corresponding input bit value on each signal pin of each IO circuit of the plurality of IO circuits, and store the sampled corresponding bit values to provide the injection current fault indicator. In a further aspect, the input sampling circuit if configured to combine the stored sampled corresponding bit values to provide the injection current fault indicator which corresponds to the plurality of IO circuits. In another further aspect, the input sampling circuit is configured to use the stored sampled corresponding bit values to provide a corresponding injection current fault indicator for each signal pin of each IO circuit. In another aspect of the embodiment, when the stored sampled bit value is a logic level high, the injection current fault indicator is asserted to indicate occurrence of an injection current fault. In another aspect, the SoC further includes an uncertainty window reset handling circuit in the always-on power domain configured to define a window of time during a sequence performed by the SoC to either place the SoC into standby mode or to wakeup the SoC from standby mode, determine if a selected reset occurs during the window of time, and provide an indicator which indicates whether or not the selected reset occurred during the window of time. In a further aspect, the window of time is defined as beginning when a boot clock is powered down and ending when inputs to the always-on power domain are isolated, and the selected reset corresponds to a destructive reset which resets all of the SoC. In another aspect, the SoC further includes an isolation circuit between the always-on power domain and switchable power domain wherein the IO circuit is coupled to the input sampling circuit via the isolation circuit. In another aspect, the window of time is defined as beginning when a boot clock is powered up and ending when a standby entry request in the always-on power domain is released, and wherein the selected reset corresponds to a pin reset received at a signal pin of the SoC which resets at least the switchable power domain of the SoC.

In another embodiment, a system-on-chip (SoC) has a switchable power domain capable of being placed in a standby mode in which a power supply of the switchable power domain is gated from the switchable power domain and has an always-on power domain, in which the SoC includes a plurality of IO circuits, each including a corresponding input signal pin; and an uncertainty window reset handling circuit (30) in the always-on power domain configured to define a window of time during a sequence performed by the SoC to either place the SoC into standby mode or to wakeup the SoC from standby mode, determine if a selected reset occurs during the window of time, and provide an indicator which indicates whether or not the selected reset occurred during the window of time. In one aspect, the window of time is defined as beginning when a boot clock is powered down and ending when inputs to the always-on power domain are isolated. In a further aspect, the selected reset corresponds to a destructive reset which resets all of the SoC. In yet a further aspect, the indicator causes a wakeup when it indicates that the destructive reset occurred during the window of time. In another aspect, the uncertainty window reset handling circuit includes a first flip flop configured to receive a boot clock power down signal and assert a first output of the first flip flop when the boot clock power down signal is asserted to indicate the boot clock is powered down; a second flip flop configured to receive an input isolation signal and negate a second output of the second flip flop when the input isolation signal is asserted to indicate the inputs to the always-on domain are isolated; and a third flip flop configured to receive a logical combination of the first and second outputs and provide the logical combination as the indicator when a destructive reset is received. In yet another aspect, the window of time is defined as beginning when a boot clock is powered up and ending when a standby entry request in the always-on power domain is released. In a further aspect, the selected reset corresponds to a pin reset received at a signal pin of the SoC. In another further aspect, the uncertainty window reset handling circuit includes a first flip flop configured to receive a boot clock power down signal and assert a first output of the first flip flop when the boot clock power down signal is negated to indicate the boot clock is powered up; a second flip flop configured to receive a standby entry request signal and negate a second output of the second flip flop when the standby entry request signal is negated to indicate the standby entry request is released; and a third flip flop configured to receive a logical combination of the first and second outputs and provide the logical combination as the indicator when a pin reset is received at a selected input signal pin of the plurality of IO circuits.

In yet another embodiment, system-on-chip (SoC) has a switchable power domain capable of being placed in a standby mode in which a power supply of the switchable power domain is turned off and has an always-on power domain, in which the SoC includes an input sampling circuit in the always-on power domain; an input/output (IO) circuit in the switchable power domain configured to, during normal operation, receive data at a corresponding signal pin when an input buffer of the IO circuit is enabled; an isolation circuit between the always-on power domain and switchable power domain wherein the corresponding signal pin is coupled to the input sampling circuit via the isolation circuit, wherein the input sampling circuit is configured to, when the switchable power domain is entering the standby mode but prior to turning off the power supply provide an override enable signal to the IO circuit to enable the input buffer of the IO circuit during standby mode, sample an input bit value on the corresponding signal pin, and store the sampled bit value to provide an injection current fault indicator; and an uncertainty window reset handling circuit in the always-on power domain configured to define a window of time during a sequence performed by the SoC to either place the SoC into standby mode or to wakeup the SoC from standby mode, determine if a selected reset occurs during the window of time, and provide an indicator which indicates whether or not the selected reset occurred during the window of time. In one aspect, the uncertainty window reset handling circuit includes a first fault detection circuit configured to define a first window of time beginning when a boot clock is powered down and ending when inputs to the always-on power domain are isolated, determine if a destructive reset occurs during the first window of time, and provide a first indicator which indicates whether or not the destructive reset occurred during the first window of time. In a further aspect, the uncertainty window reset handling circuit includes a second fault detection circuit configured to define a second window of time beginning when a boot clock is powered up and ending when a standby entry request in the always-on power domain is released, determine if a pin reset is received at a signal pin of the SoC during the second window of time, and provide a second indicator which indicates whether or not the pin reset was received during the second window of time.

What is claimed is:

1. A system-on-chip (SoC) having a switchable power domain capable of being placed in a standby mode during which a power supply of the switchable power domain is gated from the switchable power domain and having an always-on power domain, the SoC comprising:
    an input sampling circuit in the always-on power domain; and
    an input/output (IO) circuit in the switchable power domain configured to, during normal operation, receive data at a corresponding signal pin when an input buffer of the IO circuit is enabled, wherein the corresponding signal pin is coupled to the input sampling circuit,
    wherein the input sampling circuit is configured to, while the switchable power domain is entering the standby mode but before the power supply is gated, provide an override input enable signal to enable the input buffer of the IO circuit, sample an input bit value on the corresponding signal pin, and store the sampled bit value to provide an injection current fault indicator.

2. The SoC of claim 1, wherein the SoC comprises a plurality of IO circuits in the switchable power domain, including the IO circuit, wherein the input sampling circuit is configured to, while the switchable power domain is entering the standby mode but before the power supply is gated:
    provide the override enable signal to enable input buffers of each of the plurality of IO circuits, and
    sample a corresponding input bit value on each signal pin of each IO circuit of the plurality of IO circuits, and store the sampled corresponding bit values to provide the injection current fault indicator.

3. The SoC of claim 2, wherein the input sampling circuit if configured to combine the stored sampled corresponding bit values to provide the injection current fault indicator which corresponds to the plurality of IO circuits.

4. The SoC of claim 2, wherein the input sampling circuit is configured to use the stored sampled corresponding bit values to provide a corresponding injection current fault indicator for each signal pin of each IO circuit.

5. The SoC of claim 1, wherein when the stored sampled bit value is a logic level high, the injection current fault indicator is asserted to indicate occurrence of an injection current fault.

6. The SoC of claim 1, further comprising:
    an uncertainty window reset handling circuit in the always-on power domain configured to define a window of time during a sequence performed by the SoC to either place the SoC into standby mode or to wakeup the SoC from standby mode, determine if a selected reset occurs during the window of time, and provide an indicator which indicates whether or not the selected reset occurred during the window of time.

7. The SoC of claim 6, wherein the window of time is defined as beginning when a boot clock is powered down and ending when inputs to the always-on power domain are isolated, and wherein the selected reset corresponds to a destructive reset which resets all of the SoC.

8. The SoC of claim 6, further comprising an isolation circuit between the always-on power domain and switchable power domain wherein the IO circuit is coupled to the input sampling circuit via the isolation circuit.

9. The SoC of claim 6, wherein the window of time is defined as beginning when a boot clock is powered up and ending when a standby entry request in the always-on power domain is released, and wherein the selected reset corresponds to a pin reset received at a signal pin of the SoC which resets at least the switchable power domain of the SoC.

10. A system-on-chip (SoC) having a switchable power domain capable of being placed in a standby mode in which a power supply of the switchable power domain is gated from the switchable power domain and having an always-on power domain, the SoC comprising:
    a plurality of IO circuits, each including a corresponding input signal pin; and
    an uncertainty window reset handling circuit in the always-on power domain configured to:
        define a window of time during a sequence performed by the SoC to either place the SoC into standby mode or to wakeup the SoC from standby mode,
        determine if a selected reset occurs during the window of time, and
        provide an indicator which indicates whether or not the selected reset occurred during the window of time,
        wherein the window of time is defined as beginning when a boot clock is powered down and ending when inputs to the always-on power domain are isolated.

11. The SoC of claim 10, wherein the selected reset corresponds to a destructive reset which resets all of the SoC.

12. The SoC of claim 11, wherein the indicator causes a wakeup when it indicates that the destructive reset occurred during the window of time.

13. The SoC of claim 10, wherein the uncertainty window reset handling circuit comprises:
    a first flip flop configured to receive a boot clock power down signal and assert a first output of the first flip flop when the boot clock power down signal is asserted to indicate the boot clock is powered down;
    a second flip flop configured to receive an input isolation signal and negate a second output of the second flip flop when the input isolation signal is asserted to indicate the inputs to the always-on domain are isolated; and
    a third flip flop configured to receive a logical combination of the first and second outputs and provide the logical combination as the indicator when a destructive reset is received.

14. A system-on-chip (SoC) having a switchable power domain capable of being placed in a standby mode in which a power supply of the switchable power domain is gated from the switchable power domain and having an always-on power domain, the SoC comprising:
    a plurality of IO circuits, each including a corresponding input signal pin; and
    an uncertainty window reset handling circuit in the always-on power domain configured to:
        define a window of time during a sequence performed by the SoC to either place the SoC into standby mode or to wakeup the SoC from standby mode,
        determine if a selected reset occurs during the window of time, and
        provide an indicator which indicates whether or not the selected reset occurred during the window of time,
        wherein the window of time is defined as beginning when a boot clock is powered up and ending when a standby entry request in the always-on power domain is released.

15. The SoC of claim 14, wherein the selected reset corresponds to a pin reset received at a signal pin of the SoC.

16. The SoC of claim 14, wherein the uncertainty window reset handling circuit comprises:
- a first flip flop configured to receive a boot clock power down signal and assert a first output of the first flip flop when the boot clock power down signal is negated to indicate the boot clock is powered up;
- a second flip flop configured to receive a standby entry request signal and negate a second output of the second flip flop when the standby entry request signal is negated to indicate the standby entry request is released; and
- a third flip flop configured to receive a logical combination of the first and second outputs and provide the logical combination as the indicator when a pin reset is received at a selected input signal pin of the plurality of IO circuits.

17. A system-on-chip (SoC) having a switchable power domain capable of being placed in a standby mode in which a power supply of the switchable power domain is turned off and an always-on power domain, the SoC comprising:
- an input sampling circuit in the always-on power domain;
- an input/output (IO) circuit in the switchable power domain configured to, during normal operation, receive data at a corresponding signal pin when an input buffer of the IO circuit is enabled;
- an isolation circuit between the always-on power domain and switchable power domain wherein the corresponding signal pin is coupled to the input sampling circuit via the isolation circuit, wherein the input sampling circuit is configured to, when the switchable power domain is entering the standby mode but prior to turning off the power supply:
    - provide an override enable signal to the IO circuit to enable the input buffer of the IO circuit during standby mode,
    - sample an input bit value on the corresponding signal pin, and
    - store the sampled bit value to provide an injection current fault indicator; and
- an uncertainty window reset handling circuit in the always-on power domain configured to define a window of time during a sequence performed by the SoC to either place the SoC into standby mode or to wakeup the SoC from standby mode, determine if a selected reset occurs during the window of time, and provide an indicator which indicates whether or not the selected reset occurred during the window of time.

18. The SoC of claim 17, wherein the uncertainty window reset handling circuit comprises:
- a first fault detection circuit configured to:
    - define a first window of time beginning when a boot clock is powered down and ending when inputs to the always-on power domain are isolated,
    - determine if a destructive reset occurs during the first window of time, and
    - provide a first indicator which indicates whether or not the destructive reset occurred during the first window of time.

19. The SoC of claim 18, wherein the uncertainty window reset handling circuit comprises:
- a second fault detection circuit configured to:
    - define a second window of time beginning when a boot clock is powered up and ending when a standby entry request in the always-on power domain is released,
    - determine if a pin reset is received at a signal pin of the SoC during the second window of time, and
    - provide a second indicator which indicates whether or not the pin reset was received during the second window of time.

* * * * *